United States Patent [19]

Dröscher et al.

[11] Patent Number: 4,521,554
[45] Date of Patent: Jun. 4, 1985

[54] POLYBUTYLENE TEREPHTHALATE MOLDING COMPOSITION WITH HIGH COLD IMPACT STRENGTH AND AMENABLE TO THERMOPLASTIC PROCESSING

[75] Inventors: Michael Dröscher, Dorsten; Christian Gerth, Haltern; Klaus Burzin, Marl, all of Fed. Rep. of Germany

[73] Assignee: Chemische Werke Huels AG, Marl, Fed. Rep. of Germany

[21] Appl. No.: 582,645

[22] Filed: Feb. 22, 1984

[30] Foreign Application Priority Data

Feb. 22, 1983 [DE] Fed. Rep. of Germany ....... 3306008

[51] Int. Cl.³ .............................................. C08L 67/02
[52] U.S. Cl. .................... 523/522; 524/504; 525/64; 525/69
[58] Field of Search ............ 525/64, 176, 69; 524/504; 523/522

[56] References Cited

U.S. PATENT DOCUMENTS

| | | | |
|---|---|---|---|
| 3,884,882 | 5/1975 | Caywood | 525/204 |
| 3,919,353 | 11/1975 | Castelnuovo | 525/64 |
| 4,172,859 | 10/1979 | Epstein | 525/111 |
| 4,251,644 | 2/1981 | Joffrion | 525/64 |
| 4,258,143 | 3/1981 | Dombroski | 525/64 |
| 4,260,690 | 4/1981 | Binsack | 525/64 |
| 4,292,233 | 9/1981 | Binsack | 525/69 |

FOREIGN PATENT DOCUMENTS 55-21430  2/1980  Japan .
55-50058  4/1980  Japan .

*Primary Examiner*—John C. Bleutge
*Assistant Examiner*—Patricia Short
*Attorney, Agent, or Firm*—Millen & White

[57] ABSTRACT

A molding composition having cold impact strength and amenable to thermoplastic processing, comprises
(A) 66–95% by weight of polybutylene terephthalate with a viscosity number (J) of 70 to 240 cc/g and
(B) 34–5% by weight of a reaction product of
  1. 99–75% by weight of an ethylene/α-olefin/diene terpolymer having a Mooney viscosity in the range from 30 to 130 and
  2. 1–25% by weight of bicyclo[2,2,2]-2,3;5,6-dibenzooctadiene-(2,5)-dicarboxylic acid-(7,8)-anhydride.

14 Claims, No Drawings

POLYBUTYLENE TEREPHTHALATE MOLDING COMPOSITION WITH HIGH COLD IMPACT STRENGTH AND AMENABLE TO THERMOPLASTIC PROCESSING

BACKGROUND OF THE INVENTION

The present invention relates to a thermoplastically processable molding composition of polybutylene terephthalate exhibiting cold impact strength (resistance).

Polybutylene terephthalate is a valuable building material having a series of excellent properties, such as high rigidity, surface hardness, abrasion resistance, high heat distortion stability (high deflection temperature under load), dimensional stability, and rapid processability into complicated and large molded parts.

However, the impact resistance of polybutylene terephthalate, especially at temperatures below 20° C., is inadequate for some areas of application. Consequently, there is a necessity to develop polybutylene terephthalate molding compositions having an improved impact strength.

Numerous suggestions have been advanced for improving the cold impact strength of polybutylene terephthalate molding compositions by incorporating via condensation aliphatic dicarboxylic acids or diol mixtures, or by blending with other polymers, such as modified elastomers and polyolefins.

However, all of the above-described measures suffer from the deficiency that either the increase in cold impact strength is only minor, or a marked improvement in cold impact strength is accompanied by an undesirable impairment of other properties, especially rigidity and deflection temperature under load.

Thus, DOS 2,651,560 describes impact-resistant molding compositions based on a copolyester of terephthalic acid, 1,4-butanediol, and a branched, saturated aliphatic dicarboxylic acid of 7-30 carbon atoms in the molecule. However, copolyesters of this type, as compared with polybutylene terephthalate, exhibit a clearly lower melting point and poorer deflection temperature under load. Cold impact strength is not improved as compared with polybutylene terephthalate.

Blends of polyalkylene terephthalates and elastomeric, segmented copolyesters based on terephthalic acid, alkanediols, and polyalkylene glycol, although satisfying impact strength requirements even under low temperatures, are unsatisfactory because of low rigidity (DOS 2,363,512). Due to the use of the polyalkylene glycols, moreover, the aging and light stability values are unfavorably affected.

Efforts made to raise the cold impact strength of polybutylene terephthalate by additions of acrylonitrile/butadiene/styrene graft polymers (DOS 2,927,576) or of grafted polyolefins (DOS 2,902,468) either resulted in molding compositions showing too great an impairment of the typical properties of polybutylene terephthalate, namely high deflection temperature under load and rigidity, or produced molding compositions without adequate improvement in cold impact strength (DOS 2,927,576).

A similar, unsatisfactory property spectrum for the molding compositions resulted when adding rubber-elastic graft polymers based on acrylate copolymer/acrylonitrile/styrene (DOS 2,444,584) or graft-polymerized products of α-olefin/vinyl ester copolymers and polymerizable, unsaturated carboxylic acids (esters) (DOS 2,254,002).

The elastomer-addition procedure for rendering polybutylene terephthalate impact resistant which has heretofore been most effective demands functionalization of specific elastomers with maleic anhydride according to methods as described, for example, in DOS 2,401,149. However, during functionalization with maleic anhydride, gel formation occurs because of secondary reactions, the undesirable gel content of the functionalized elastomer being up to 5%.

SUMMARY OF THE INVENTION

It is an object of the present invention to provide gel-free polybutylene terephthalate molding compositions having high impact strength and high rigidity, as well as an improved deflection temperature under load, and lacking the above-discussed disadvantages or possessing them to a significantly reduced extent.

Upon further study of the specification and appended claims, further objects and advantages of this invention will become apparent to those skilled in the art.

These objects have been attained by providing molding compositions comprising:

(A) 66-95 percent by weight of polybutylene terephthalate with a viscosity number (J) (according to DIN 16 779, Part 2) of 70 to 240 cc/g and (B) 34-35 percent by weight of a reaction product from the reaction of:
  1. 99-75% by weight—based on the total weight of component (B)—of an ethylene/α-olefin/diene terpolymer comprising 45-75 parts by weight of ethylene, 20-45 parts by weight of α-olefin, and 2-10 parts by weight of an unconjugated diene, wherein the terpolymer has a Mooney viscosity (ML 1+4 at 100° C.—measured according to DIN 53 523) of 30-130, and
  2. 1-25% by weight—based on the total weight of reaction product (B)—of bicyclo[2,2,2]-2,3;5,6-dibenzooctadiene-(2,5)-dicarboxylic acid-(7,8)-anhydride.

DETAILED DISCUSSION

Up to 20 mole % e.g., 1-20 mole % of terephthalic acid component in the polybutylene terephthalate can be replaced by other conventional dicarboxylic acids. Examples of suitable dicarboxylic acids are isophthalic acid, phthalic acid, cyclohexane-1,4-dicarboxylic acid, adipic acid, azelaic acid, decanedicarboxylic acid, or similar compounds, e.g., $C_{6-20}$-alkane dicarboxylic acids or cyclohexane dicarboxylic acids.

Up to 20 mole % e.g., 1-20 mole % of 1,4-butanediol component in the polybutylene terephthalate can be replaced by other diols, e.g., ethylene glycol, 1,3-propanediol, 1,6-hexanediol, neopentyl glycol, 1,4-dimethylolcyclohexane, 1,12-dodecanediol, or similar compounds, e.g., $C_{2-20}$-alkane diols or cyclohexane diols.

The polybutylene terephthalate utilized for the blend is manufactured in fully conventional fashion, e.g., by trans- or interesterification and subsequent polycondensation of terephthalic acid or its polyesterforming derivatives and 1,4-butanediol in the presence of catalysts. (See, e.g., Sorensen and Campbell, Preparative Methods of Polymer Chemistry, Interscience Publishers Inc., N.Y., 1961, pages 111-127; "Kunststoff-Handbuch" [Plastics Manual] VIII, C. Hanser Verlag, Munich, 1973; and Journal of Polymer Science, Part A 1, 4:

1851–1859, 1966, whose disclosures are incorporated by reference herein.) The polybutylene terephthalate, including those with substitute acid and/or diol components, utilized in this invention have a viscosity number (J) of 70–240 cc/g, preferably 80–180 cc/g, which values are conventionally achievable.

The ethylene/α-olefin/diene terpolymers (component B.1) are produced conventionally from ethylene, one or more α-olefins of 3–8 carbon atoms, primarily propylene and/or butene-1, and one or several unconjugated dienes e.g., using the so-called Ziegler-Natta catalysts which can additionally contain activators and modifiers, in a solution or dispersion at temperatures of −30° to +100° C., for example according to the methods of DAS's 1,570,352, 1,595,442, and 1,720,450, as well as DOS 2,427,343.

The terpolymers comprise 45–75 parts by weight, preferably 60–75 parts by weight of ethylene and of 20–45 parts by weight, preferably 20–30 parts by weight of an α-olefin, preferably propylene and/or butene-1, and contain an unconjugated diene in such an amount that the terpolymers exhibit 0.5–30 double bonds/1000 carbon atoms. This formulation corresponds to a content of 2–10 parts by weight, preferably 5–10 parts by weight of an unconjugated diene. Especially suitable dienes include cis- and trans-1,4-hexadiene, dicyclopentadiene, 5-methylene-, 5-ethylidene-, or 5-isopropylidene-2-norbornene, e.g., $C_5$–$C_{20}$ -cyclic and acyclic alkane unconjugated dienes.

The Mooney viscosity of the terpolymers is in the range from 30 to 130, preferably 35–85, all readily achievable conventionally,. The terpolymers are contained in component (B) in 99–75 percent by weight, preferably 97–85 percent by weight. They are even commercially available under the general name of EPDM elastomers under numerous trademark designations. They can be utilized as crumbs, powders, or granules. In order to reduce their tendency toward tackiness, the terpolymers frequently contain inert separating powders, such as polyethylene, talc, or "Aerosil" in amounts of up to about 5% by weight based on the total weight of terpolymer. These are suitable for use in this invention.

It is also possible to utilize polymeric mixtures of the terpolymers with, e.g., 1–50 wt %, based on the total weight of terpolymer of polyolefins, e.g., polyethylene or polypropylene, e.g., polymers of $C_{2-4}$ -olefins, in granulated form. This is expedient, in particular, if the terpolymer by itself is very tacky, for example due to a low ethylene proportion, an amorphous structure, or a low molecular weight.

The terpolymers are reacted with bicyclo[2,2,2]-2,3;5,6-dibenzooctadiene-(2,5)-dicarboxylic acid-(7,8)-anhydride (called "Anhydride" hereinbelow). Component (B) contains 99–75% by weight, preferably 97–85% by weight of terpolymer component and 1–25% by weight, preferably 3–15% by weight of "Anhydride" component.

Addition of the "Anhydride" to the terpolymer can be effected, for example, by mixing the solid "Anhydride" with the terpolymer in pulverized, crumb, or granulated form, in a paddle mixer. According to another process, the "Anhydride" can be fed in metered amounts into a masticator charged with the terpolymer.

The reaction of the "Anhydride" with the terpolymer preferably is effected in a masticator (kneader) operating continuously or discontinuously at temperatures of 270° to 320° C. and with reaction times of about 30 seconds to 30 minutes, preferably at temperatures of 280° to 315° C. and time periods of about one minute to five minutes in a continuous masticator, and about five to twenty minutes in a discontinuous masticator.

The reaction times, when using dry mixtures of "Anhydride" and the terpolymer, are the average residence times of the melt in the masticator; when feeding the "Anhydride" in metered amounts into the masticator, the reaction time is the residence time of the melt at the reaction temperature after completing the addition of the "Anhydride".

The molding compositions of this invention are produced from polybutylene terephthalate and the terpolymer reacted with the "Anhydride", by remelting, for example, in a twin-screw extruder according to customary methods of the state of the art. Thorough intermixing of the modified terpolymer must be provided, for example by the use of kneading blocks.

The molding compositions of this invention contain 66–95 parts by weight, preferably 75–90 parts by weight of polybutylene terephthalate component and 5–34 parts by weight, preferably 25–10 parts by weight of the reaction product (component B) of terpolymer and "Anhydride".

To further improve cold impact strength, it is advantageous to subject the mixture, produced in the melt, made up of polybutylene terephthalate and component (B) to a thermal aftertreatment. The latter is especially advantageous in case only small proportions (e.g., 5–10 wt %) of component (B) are utilized. The mixture is heated, for example in granulated form, in the absence of oxygen ($N_2$ stream, vacuum), preferably in a fluidized bed for several hours (e.g., 6–36 hours) to temperatures of up to about 5° C. below the melting point e.g., 180° C. to up to 5° C. below the melting point. The thermal aftertreatment can also be conducted advantageously according to the methods described in German Pat. Nos. 3,033,468 and 3,033,469, using 1,4-butanediol. Also possible for the thermal aftertreatment is the use of a degasification extruder.

Admixture of additives (e.g., 0,1–50 wt % in total based on total composition weight), customary according to the state of the art, for example stabilizers, processing aids, fillers, such as for example, minerals or micro glass beads, carbon black, and pigments, can be effected simultaneously with or after the thermal aftertreatment.

The molding compositions of this invention are distinguished by an extraordinary combination of properties. The molding compositions are devoid of gel proportions and have outstanding processing properties. They exhibit an uncommonly high cold impact strength, especially even at temperatures of between −20° and −40° C. This excellent cold impact strength leads to a markedly improved ductility, higher scratch resistance, and a markedly reduced susceptibility toward sudden deterioration of properties, as compared with conventional molding compositions.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any whatsoever. In the following examples, all temperatures are set forth uncorrected in degrees Celsius; unless otherwise indicated, all parts and percentages are by weight.

The parameters given in the specification and in the tests below were determined by means of the measuring methods described below.

Viscosity number (J) of PBTP was determined according to DIN 16 779, Part 2, on solutions of 0.5 g polybutylene terephthalate in 100 ml of phenol/o-dichlorobenzene (50/50 parts by weight) at 25° C.

Gel content is the portion of functionalized elastomer remaining undissolved in boiling tetrahydrofuran under atmospheric pressure after 48 hours.

Mooney viscosity of the terpolymers was determined according to DIN 53 523, Parts 1–3 [under the conditions of ML(1+4) 100° C.].

one of the three above-described reaction products. This mixture is remelted in a twin-screw kneader, the efficiency of which has been enhanced by kneading blocks, and is then granulated.

Respectively 120 kg of the molding compositions I through III is subjected to thermal aftertreatment under vacuum at 200° C. for 24 hours in a 500-liter tumbler dryer. The viscosity number and notch impact strength, respectively, of the molding compositions are indicated in the table below. For comparison, the unmixed homopolybutylene terephthalate is utilized, as employed in the production of the molding compositions (molding composition A).

TABLE

| Molding Composition | Ingredients in Parts by Weight | J [cc/g] | Notch Impact Strength [kJ/m$^2$] 23° C. | −20° C. | −40° C. |
|---|---|---|---|---|---|
| I | 80 PBTP* (J = 92 cc/g) 20 Reaction Product 1 | 130 | 47 | 13 | 10 |
| II | 80 PBTP* (J = 92 cc/g) 20 Reaction Product 2 | 121 | 50 | 16 | 11 |
| III | 80 PBTP* (J = 92 cc/g) 20 Reaction Product 3 | 121 | 42 | 12 | 7 |
| A | 100 PBTP* (Thermally Aftertreated) | 120 | 3 | 3 | 3 |

*PBTP = Polybutylene terephthalate

Notch impact resistance ($a_K$) of the molding compositions was measured according to DIN 53 453 on standard rodlets with rectangular notch.

EXAMPLES

Preparation of Reaction Product from Terpolymer and "Anhydride" (Component B)

Reaction Product 1

A mixture is prepared from 8.5 parts by weight of bicyclo[2,2,2]-2,3;5,6-dibenzooctadiene-2,5-dicarboxylic acid 7,8-anhydride and 92.5 parts by weight of a pulverulent terpolymer of ethylene, propylene, and 5-ethylidenenorbornene containing 30% by weight of polypropylene and 7 double bonds per 1000 carbon atoms and exhibiting a Mooney viscosity of 85 (ethylene content of terpolymer 73% by weight) in a laboratory mixer.

The mixture is melted in a twin-screw kneader, the heating zones of which are set at 300° C. except for the first, cooled zone, thus performing the desired reaction, and then granulated. The product is dried to a residual moisture of <1%. No gel content is found.

Reaction Product 2

The process is conducted analogously to the production of reaction product 1, except that the terpolymer of otherwise identical composition has a Mooney viscosity of 35.

Reaction Product 3

A mixture is prepared from 4.25 parts by weight of bicyclo[2,2,2]-2,3;5,6-dibenzooctadiene-2,5-dicarboxylic acid 7,8-anhydride and 95.75 parts by weight of a crumb-shaped terpolymer (73% by weight of ethylene, 22% by weight of propylene, diene: 5-ethylidenenorbornene; 7 double bonds/1000 carbon atoms) having a Mooney viscosity of 85. The production of the mixture and the reaction take place analogously to the mode of operation in case of reaction product 1.

Production of the Molding Compositions I–III According to the Invention

Respectively 80 parts by weight of homopolybutylene terephthalate having a viscosity number (J) of 92 cc/g is blended with respectively 20 parts by weight of The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermoplastically processable molding composition of high cold impact strength, comprising
   (A) 66–95% by weight of polybutylene terephthalate of a viscosity number (J), according to DIN [German Industrial Standard] 16 779, Part 2, of 70 to 240 cc/g, and
   (B) 34–35% by weight of the addition reaction product of
      (a) 99–75% by weight, based on the total weight of component (B), of an ethylene/α-olefin/diene terpolymer comprising 45–75 percent by weight of ethylene, 20–45 percent by weight of a $C_{3-8}$-α-olefin, and 2–10 parts by weight of a $C_5$–$C_{20}$-cyclic or acyclic unconjugated alkane diene, wherein the terpolymer has a Mooney viscosity, ML 1+4 at 100° C., measured according to DIN 53 523, of 30–130, and
      (b) 1–25% by weight, based on the total weight of component (B), of bicyclo[2,2,2]-2,3;5,6-dibenzooctadiene-(2,5)-dicarboxylic acid-(7,8)-anhydride.

2. A composition of claim 1 comprising 75–90% of weight of component (A) and 25–10% of weight of component (B).

3. A composition of claim 1 wherein, in component (B), the amount of component (a) is 97–85% by weight and of component (b) is 3–15% by weight.

4. A composition of claim 1 wherein, in terpolymer component (B) (a), the relative amounts of monomers are 60–75 weight % of ethylene, 20–30 weight % of α-olefin and 5–10 weight % of unconjugated diene.

5. A composition of claim 1 wherein the viscosity number of the polybutylene terephthalate is 80–180 cc/g.

6. A composition of claim 1 wherein an amount up to 20 mole % of the terephthalic acid component is replaced by a corresponding molar amount of a $C_{6-20}$-alkane dicarboxylic acid.

7. A composition of claim 1 wherein an amount up to 20 mole % of the 1,4-butanediol component is replaced by a corresponding molar amount of a $C_{2-20}$-alkane diol or a cyclohexane diol.

8. A composition of claim 1 wherein the α-olefin in the terpolymer is propylene or butene-1.

9. A composition of claim 1 wherein the unconjugated diene in the terpolymer is cis- and trans-1,4-hexadiene, (dicyclopentane)-diene, or 5-methylene-, 5-ethylidene-, or 5-isopropylidene-2-norbornene.

10. A composition of claim 1 wherein the terpolymer has a Mooney viscosity of 35–85.

11. A composition of claim 1 wherein the terpolymer contains an amount of an inert detackifier of up to 5 weight %.

12. A composition of claim 1 wherein components (A) and (B) are blended by remelting.

13. A composition of claim 12 wherein, after the remelting operation, the mixture of (A) and (B) is subjected to a thermal aftertreatment in the substantial absence of oxygen at a temperature up to 5° C. below the melting point of the composition.

14. In a method of molding a polybutylene terephthalate composition into a shaped body, the improvement wherein said composition is that of claim 1.

* * * * *